Figure 14:
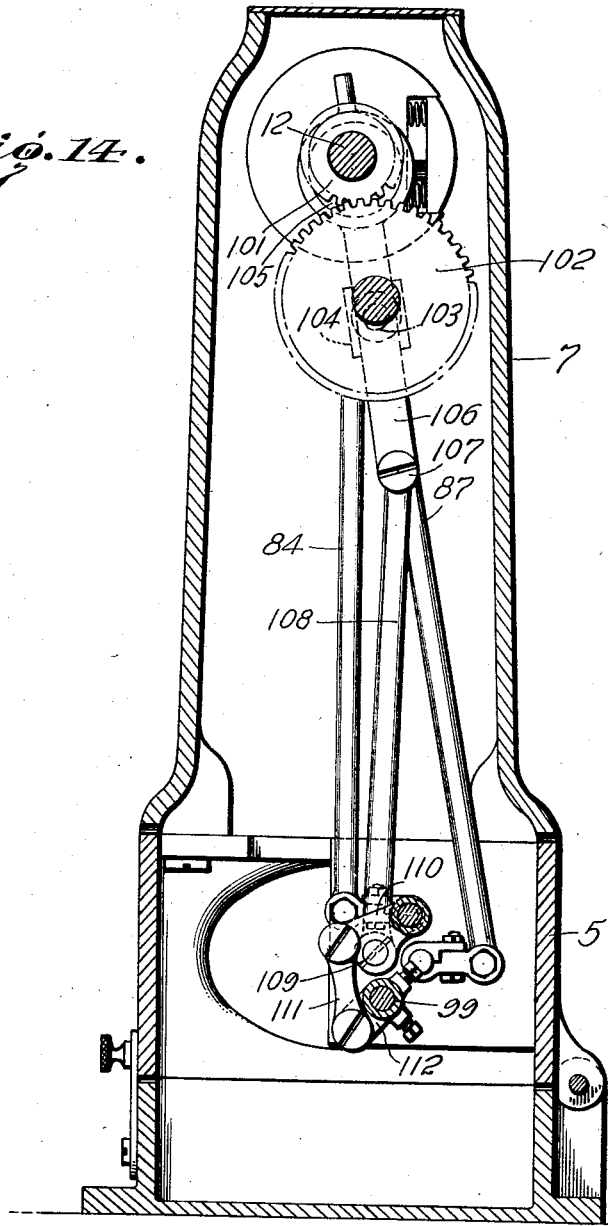

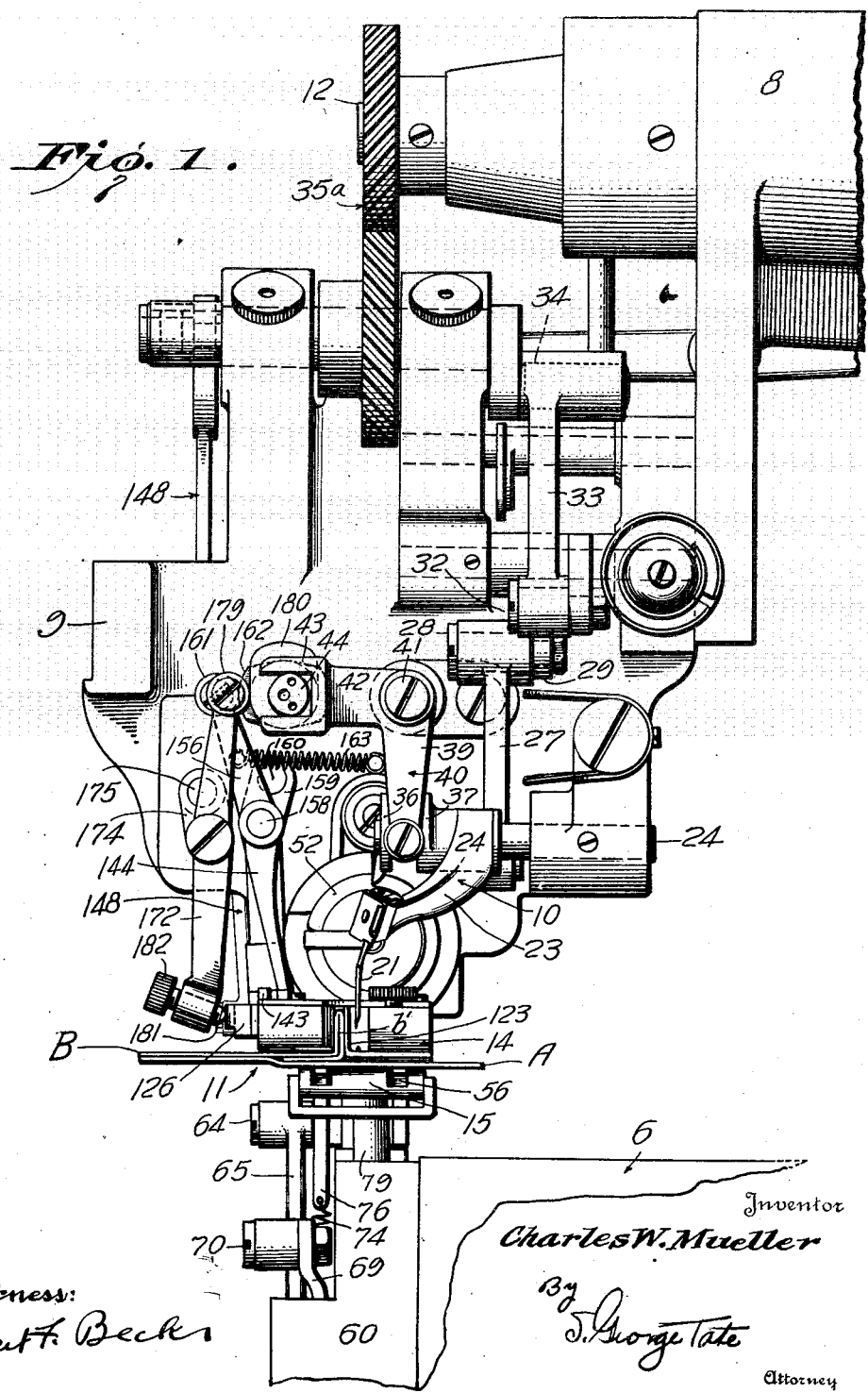

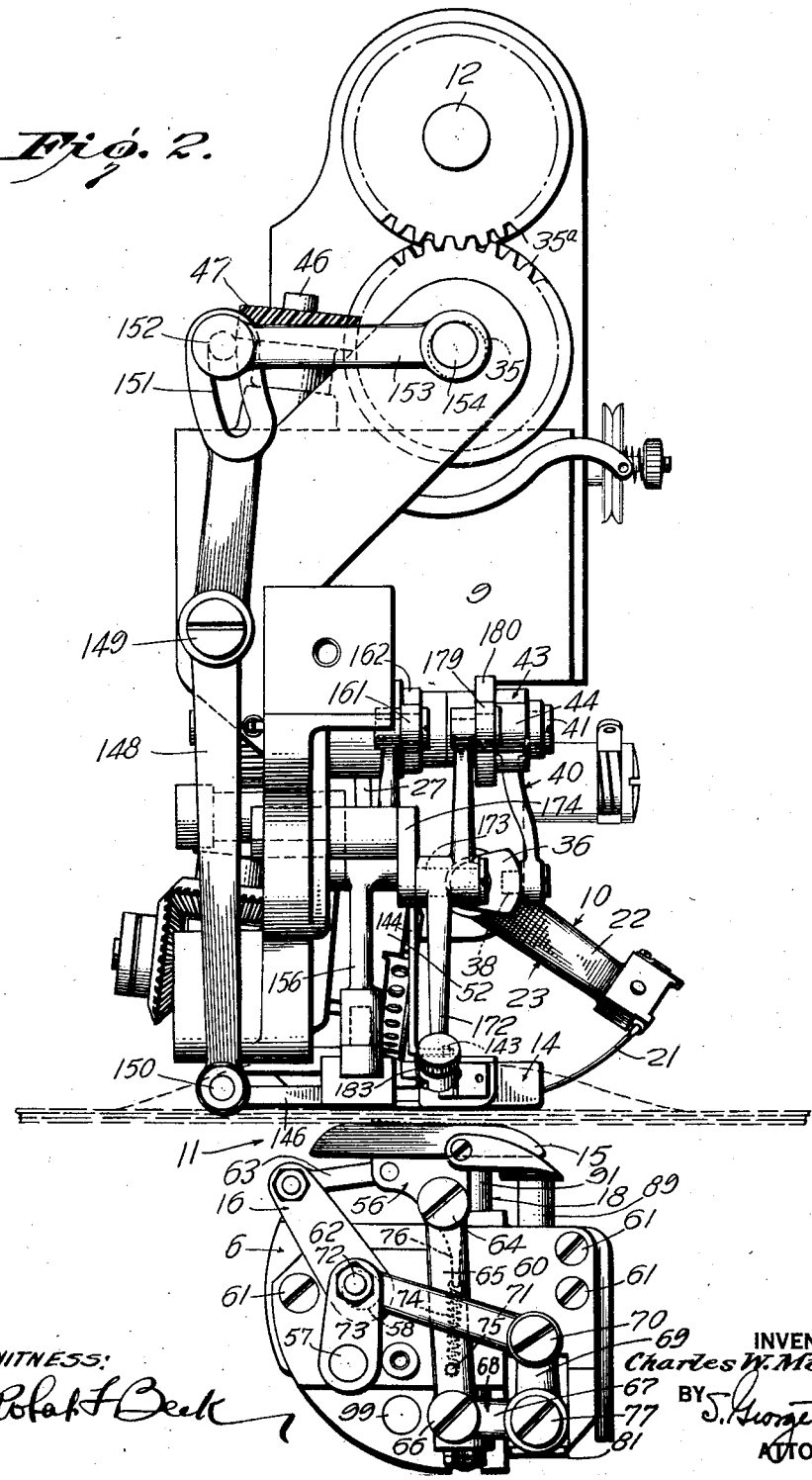

Dec. 24, 1929.     C. W. MUELLER     1,740,901
BLINDSTITCH FELLING MACHINE
Filed April 26, 1927     10 Sheets-Sheet 3

Dec. 24, 1929.  C. W. MUELLER  1,740,901
BLINDSTITCH FELLING MACHINE
Filed April 26, 1927  10 Sheets-Sheet 4
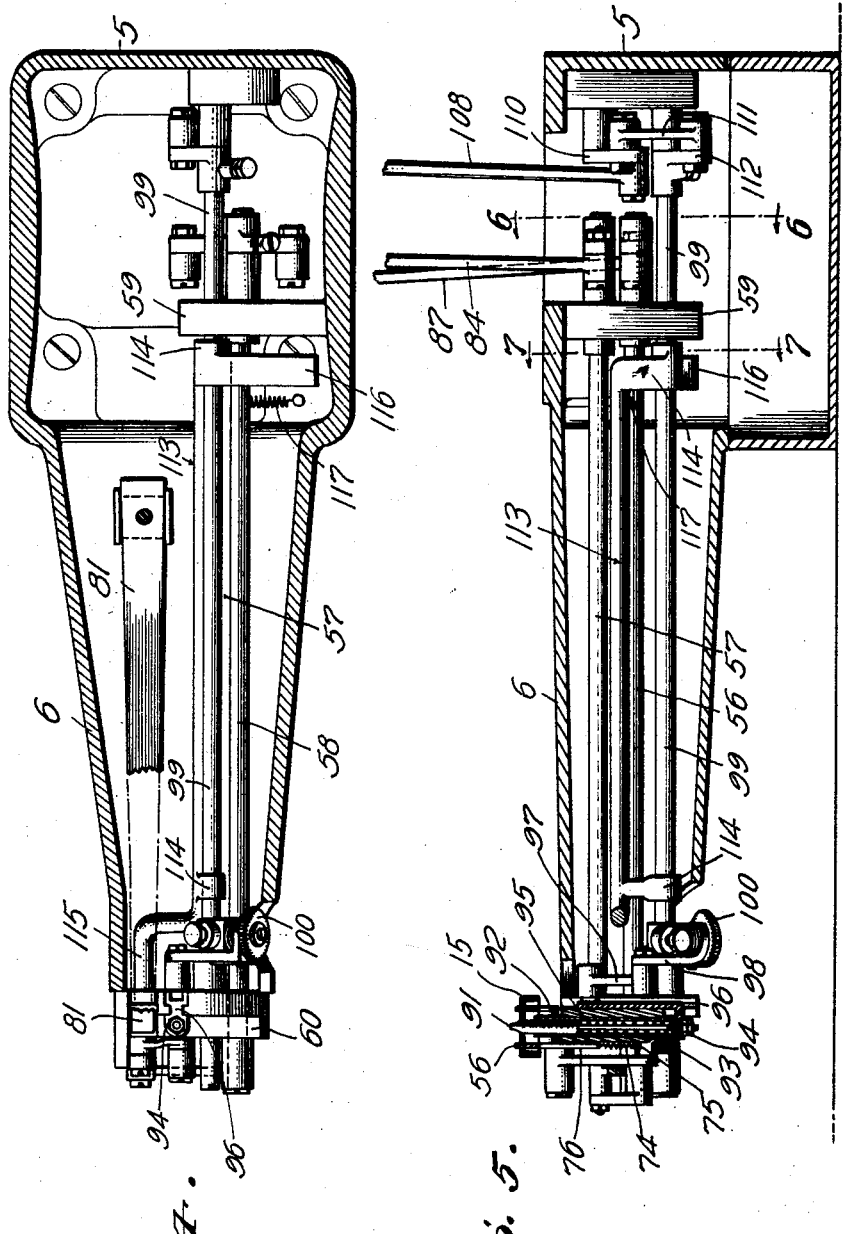

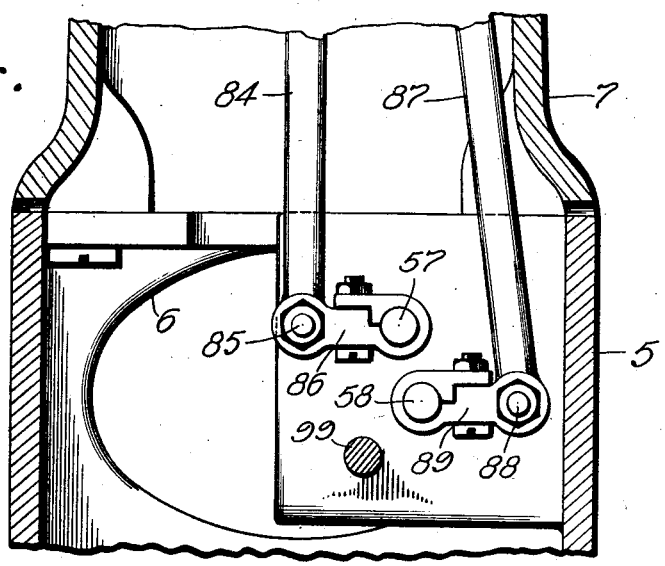
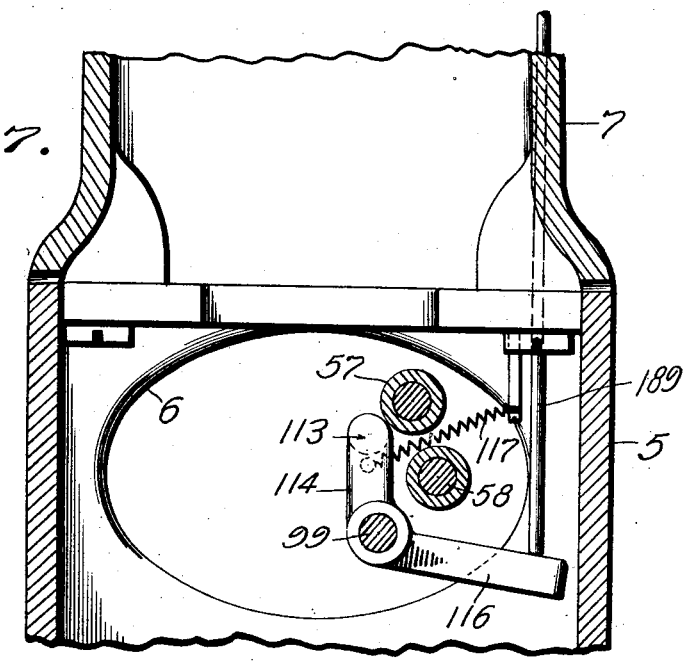

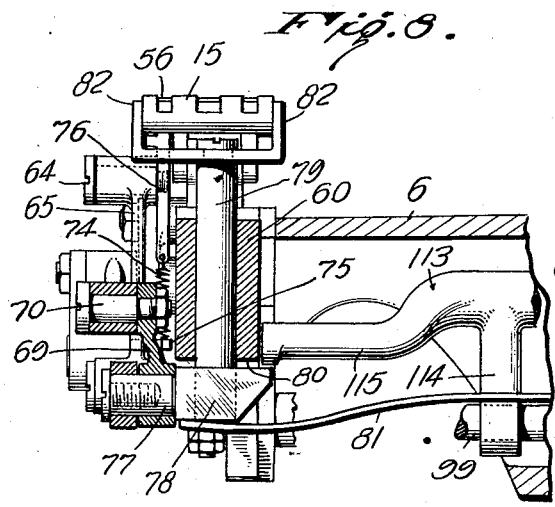
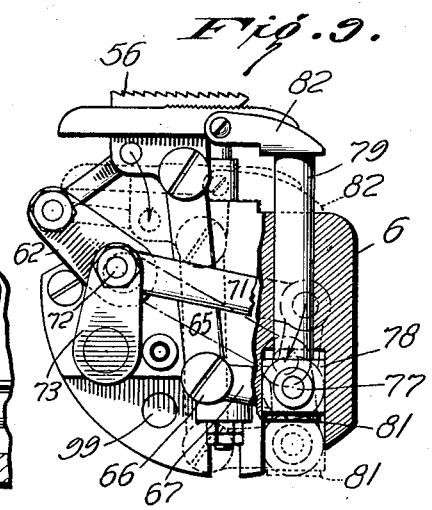
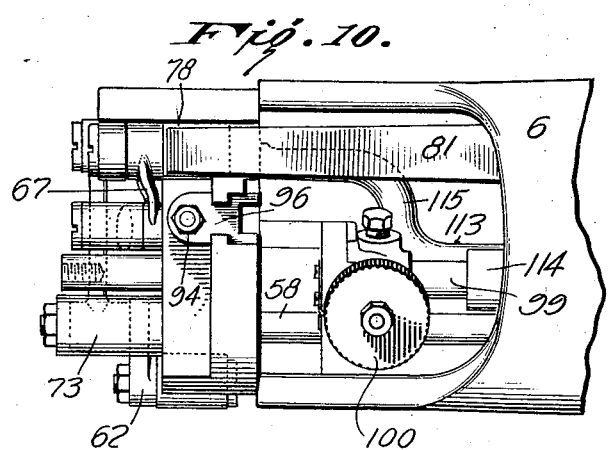
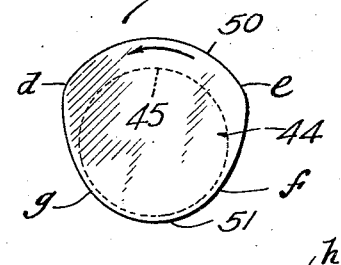
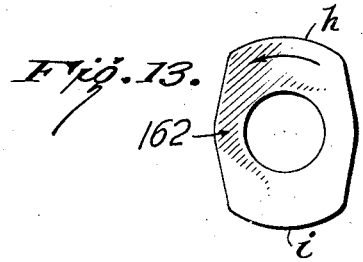
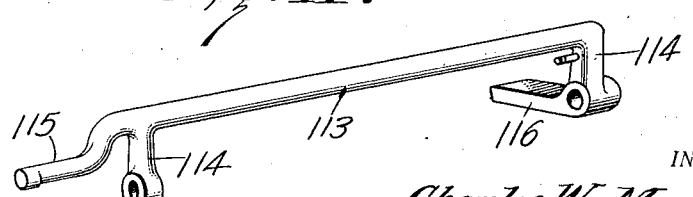

Dec. 24, 1929.　　　C. W. MUELLER　　　1,740,901
BLINDSTITCH FELLING MACHINE
Filed April 26, 1927　　10 Sheets-Sheet 7

INVENTOR.
Charles W. Mueller,
BY
J. George Tate
ATTORNEY.

WITNESS:
Robert F. Beck

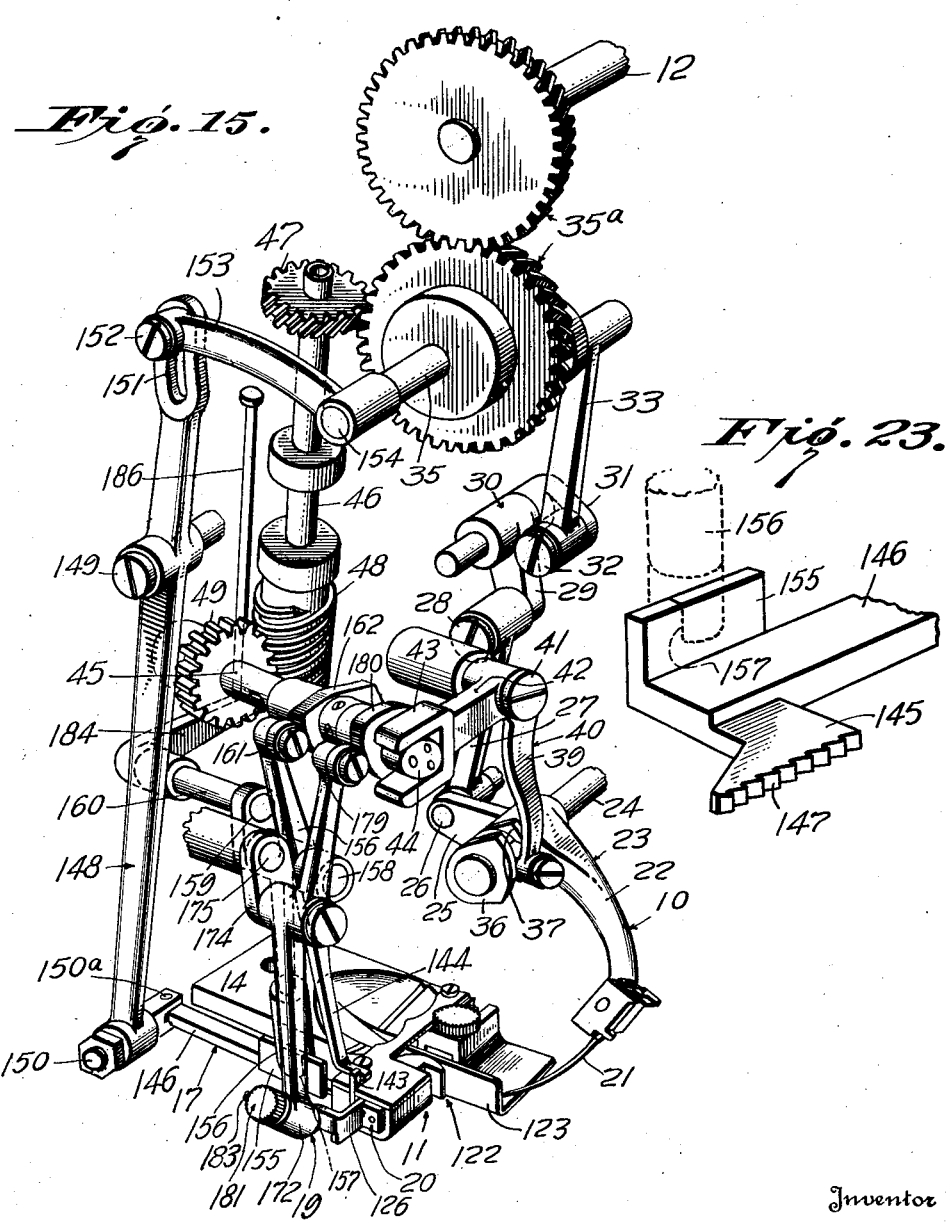

Dec. 24, 1929. C. W. MUELLER 1,740,901
BLINDSTITCH FELLING MACHINE
Filed April 26, 1927 10 Sheets-Sheet 9
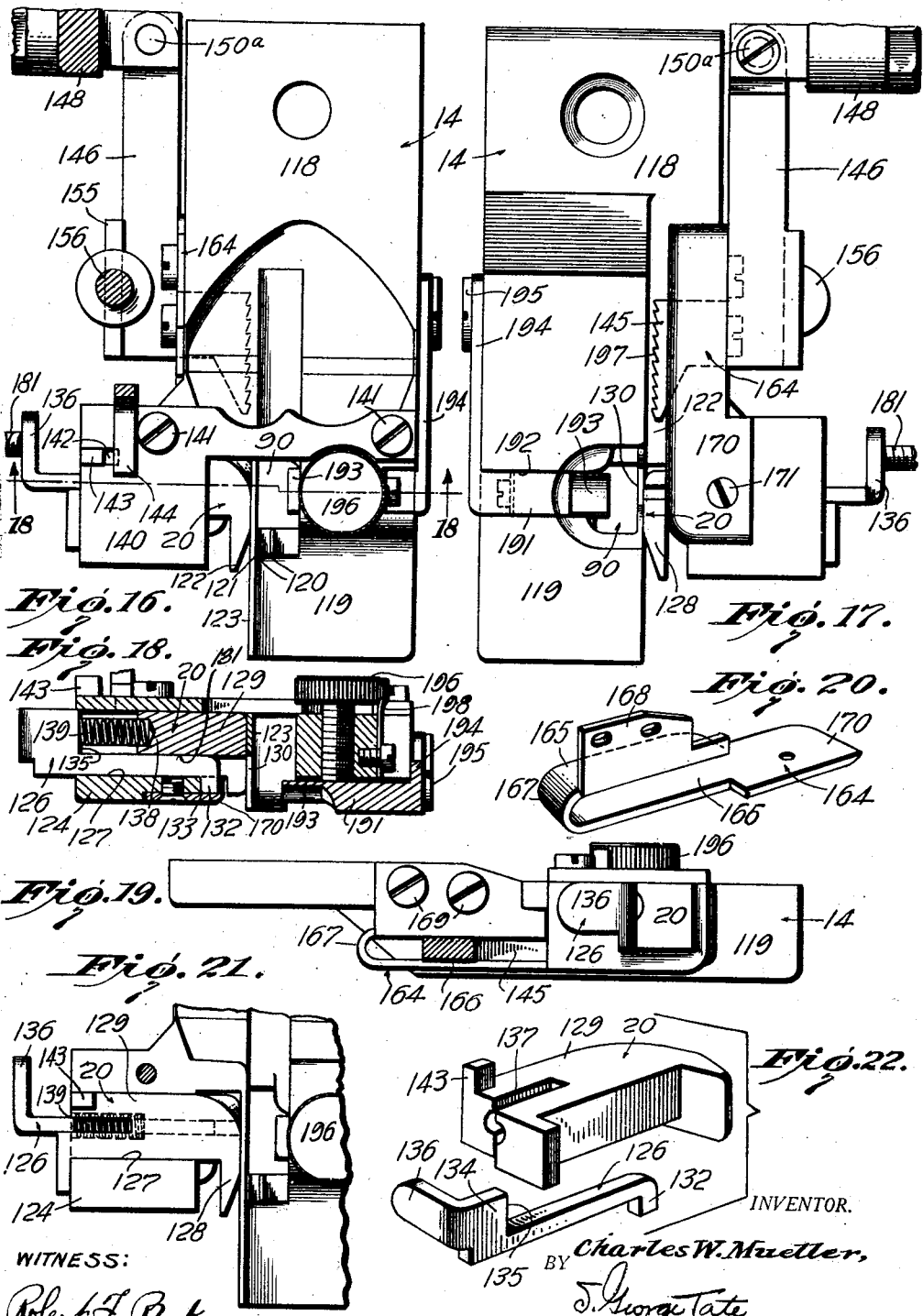
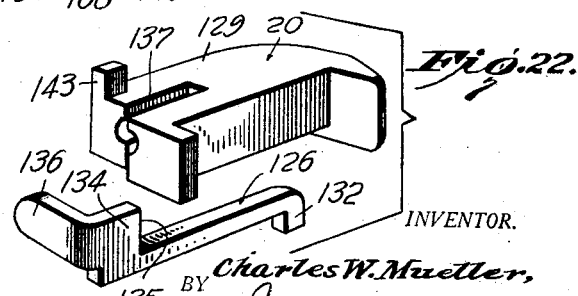
INVENTOR.
Charles W. Mueller,
BY J. George Tate
ATTORNEY.
WITNESS:
Robert F. Beck

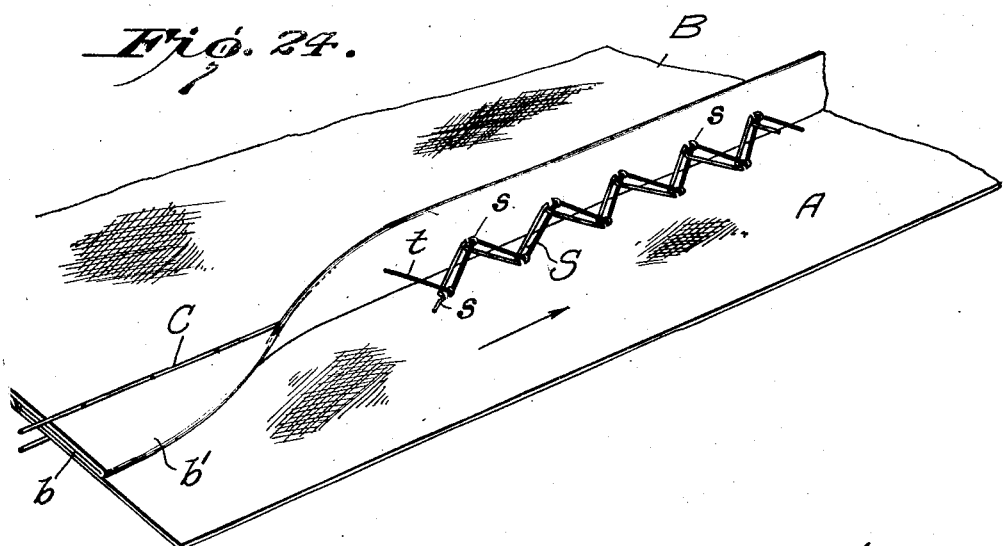
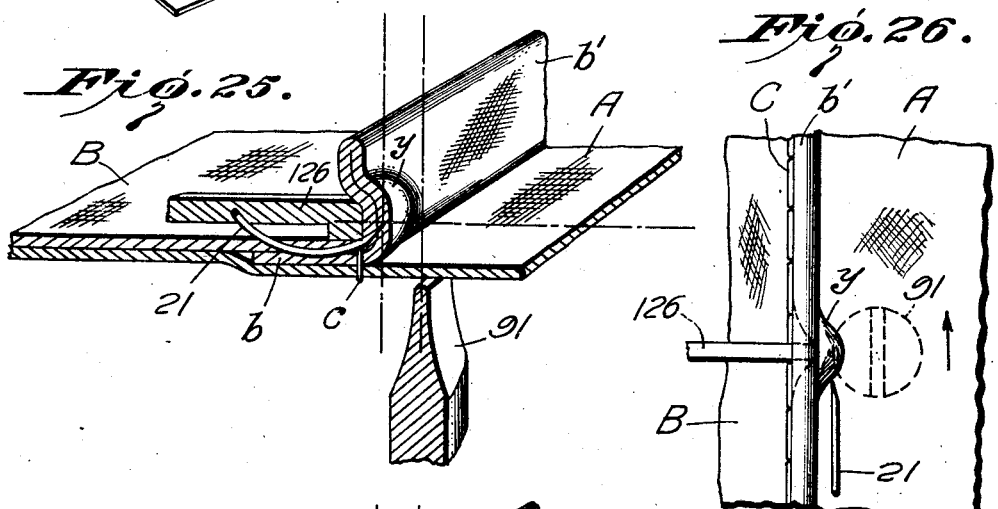
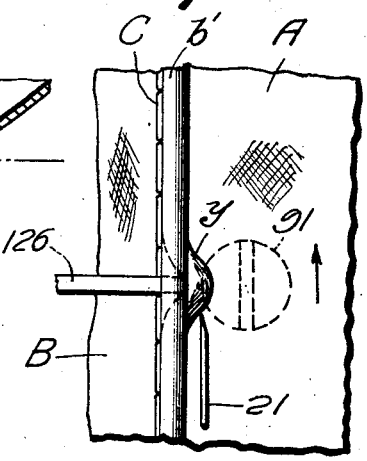
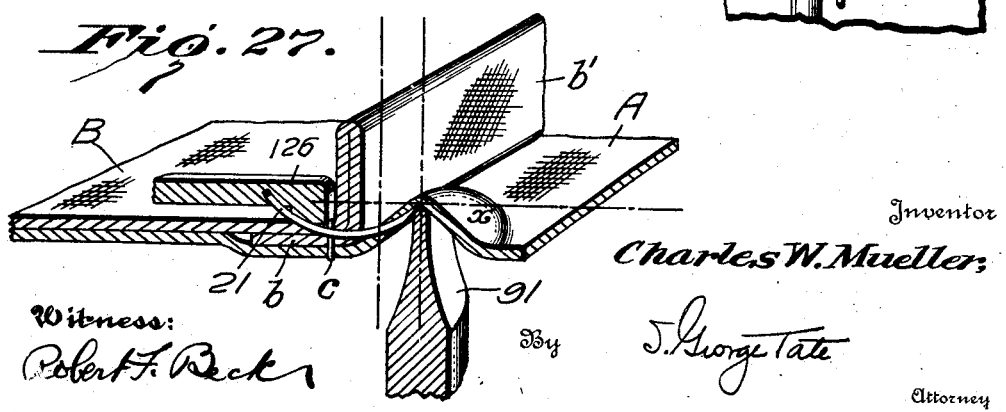

Patented Dec. 24, 1929

1,740,901

UNITED STATES PATENT OFFICE

CHARLES W. MUELLER, OF ST. LOUIS, MISSOURI, ASSIGNOR TO LEWIS INVISIBLE STITCH MACHINE COMPANY, OF ST. LOUIS, MISSOURI, A CORPORATION OF MAINE

BLINDSTITCH FELLING MACHINE

Application filed April 26, 1927. Serial No. 186,674.

This invention relates to new and useful improvements in blind stitch felling machines which are especially adapted for felling a superposed layer upon a base layer of material. The present invention is particularly intended for use in felling the edges of coat linings to the body of the garment, the line of blind stitches connecting the superposed lining or layer and the base layer or body fabric, being disposed at a considerable distance from the infolded edge of the lining and extending parallel with said infolded edge whereby the infolded edge portion of the lining may afterwards be pressed down onto the base layer and thereby cover the line of blind stitches.

This application embodies certain improvements over applicant's co-pending application Serial No. 186,672, filed April 26, 1927.

Heretofore in stitching linings to the body fabric of coats, it has been customary to first superpose the lining on the body fabric, then inturn the edge portion of the lining, then to secure the lining to the body fabric by a second line of basting stitches disposed in parallelism with the first mentioned line of basting stitches and to leave a fullness of lining material between said lines of basting stitches, then to secure the extreme folded edge of the lining to the body fabric by a line of blind stitches, then to remove the first line of basting stitches, then removing the fullness to the lining by folding the same over the felled edge, then pressing the lining and finally removing the second formed line of basting stitches. This mode of operation is decidedly objectionable for the reason that more or less fullness in the lining is liable to be formed and consequently the folded edge of the lining which overlaps and covers the line of blind stitches may or may not run straight. Furthermore, inasmuch as practice calls for an extended margin or overlapping portion of a uniform width, it will be readily apparent that if the two lines of basting stitches are not formed in straight lines and in exact parallelism the resultant extended margin will vary to a corresponding extent.

To overcome the above objection, I first superpose a coat lining on the body fabric, then infold the marginal edge portion of the lining, and then secure said infolded edge portion to the body fabric along a line extending parallel with the folded edge and at a considerable distance therefrom. The assembly is then fed through the machine by my improved feeding mechanism with the folded edge portion extending upwardly in a plane at substantially right angles to the body fabric, the under ply of the upturned folded edge portion being secured to the body fabric by a line of blind stitches which extend in close proximity to the line of basting stitches, thus insuring a uniform width or margin to the folded edge portion of the lining which overlaps the line of blind stitches.

One of the principal objects of my invention is to provide a mechanism for presenting the work to the stitch forming mechanism whereby the felling operation may be accurately and speedily performed.

Another object of the invention is to provide a work presenting mechanism for the purpose set forth which insures the feeding of the upturned edge portion of the lining in unison with the feeding of the body fabric, whereby all drag to the upturned portion will be eliminated thus insuring a perfect appearance of the felled article.

A further object of the invention is to provide a work presenting mechanism for the purpose set forth which includes a means located under the base layer for presenting a node of material to the point of needle penetration, a reciprocatory plunger operating above the lining for projecting a node of the upturned edge portion material into needle penetrating position, and means for clamping said upturned portion during the effective stroke of said reciprocatory plunger whereby the node of material projected by said plunger will be accurately positioned and maintained during the penetrating stroke of the needle.

A further object of the invention is to provide means for adjusting the working position of the reciprocatory plunger whereby the depth of needle penetration in the upturned portion of the lining may be varied to suit linings of different thicknesses.

A still further object of the invention is to provide a manually controlled means for opening the work presenting mechanism whereby the work may be readily inserted or withdrawn whenever desired.

With these and other objects in view which will more fully appear, the nature of the invention will be more clearly understood by following the description, the appended claims, and the several views illustrated in the accompanying drawings.

In the drawings:

Figure 1 is an enlarged front elevation of a sewing machine constructed in accordance with my invention, Figure 2 is a lefthand end elevation thereof.

Figure 3 is a rear elevation of the machine, parts thereof being shown in section, Figure 4 is a horizontal sectional view through the work arm and standard, Figure 5 is a vertical sectional view taken on the line 5—5 of Figure 4, Figure 6 is an enlarged detailed sectional view taken on the line 6—6 of Figure 5, Figure 7 is an enlarged detailed sectional view taken on the line 7—7 of Fig. 5, Figure 8 is an enlarged sectional view showing the means for yieldably supporting the lower feed and work clamp, Figure 9 is an enlarged front elevation of the work arm showing the feed and work clamp in their depressed position, Figure 10 is a bottom plan view of the structure shown in Fig. 8, Figure 11 is a perspective view of the lever for depressing the lower feed, Figure 12 is a plan view of the cam for imparting shogging movements to the needle lever, Figure 13 is a plan view of the cam for imparting lateral movements to the top feed dog, Figure 14 is a vertical sectional view taken on the line 14—14 of Fig. 3, showing the actuating mechanism for the lower plunger, Figure 15 is a perspective view showing the driving mechanisms for the needle, the upper feed, and the upper plunger, Figure 16 is an enlarged top plan view of the main presser foot and the associated parts, Figure 17 is a bottom plan view thereof, Figure 18 is a transverse sectional view taken on the line 18—18 of Fig. 16, Figure 19 is a side elevation of the main presser foot as shown in Fig. 16, Figure 20 is a perspective view of the guide for the upper feed dog, Figure 21 is an enlarged detailed plan view showing the mounting of the upper plunger and the movable presser foot.

Figure 22 is a perspective view of the movable presser foot and the upper plunger, the parts being shown in separated relation, Figure 23 is a perspective view of the upper feed dog, Figure 24 is a perspective view showing the positions of the fabrics while being fed through the machine, together with a line of stitches connecting the fabrics, Figure 25 is a perspective view showing the relation between the fabrics, the upper and lower plungers, and the needle when the latter is about to penetrate a node of upturned material on its lefthand shogging stroke, Figure 26 is a plan view thereof, and Figure 27 is a perspective view similar to Figure 25 but showing the needle during its righthand shogging stroke about to penetrate the base layer.

Like reference numerals designate corresponding parts throughout the several figures of the drawings.

The present invention is illustrated herein as embodied in a blind stitch sewing machine of the Lewis type, and comprises a frame which includes a base 5, a laterally extending work arm 6, a standard 7, an overhanging arm 8, and a stitching head 9 which is secured to the free end of the overhanging arm 8 and is disposed above the outer end of the work arm 6.

The felling operation for which this machine is particularly adapted is illustrated in Fig. 24. In this figure, I have shown a base layer A, which may be the body fabric of a coat, and a superposed layer B, which may be the lining therefor. The lining B has its marginal edge portion infolded, as indicated at $b$, and this infolded portion is secured to the body fabric A by means of a line of basting stitches C which extends parallel to the folded edge portion and at a point somewhat removed therefrom so as to form a fairly wide marginal folded portion $b'$. The parts thus joined are fed through the sewing machine forming my invention with the marginal folded portion $b'$ turned up into a vertical plane. As the work is fed through the sewing machine, the upper and lower layers are united by a line of blind stitches S, said stitches including a plurality of needle thread loops $s$ which alternately enter and emerge from the base layer A and the infolded edge portion $b$ of the marginal folded portion $b'$ of the upper layer of lining B, said needle thread loop $s$ being anchored by a bobbin thread $t$. The line of blind stitches S is located in close proximity to the corner or angle between the base layer and the marginal folded portion $b'$ whereby after the article has been felled, said marginal folded portion may be returned to its normal or horizontal position and thereby completely cover the line of formed blind stitches. The line of basting stitches C is then withdrawn.

The machine includes a stitch forming mechanism which I have indicated as a whole by the reference numeral 10, and a work presenting mechanism which I have indicated as a whole by the refernece numeral 11. Both the stitch forming mechanism 10 and the work presenting mechanism 11 are operated from a main rotary shaft 12 which extends longitudinally of the overhanging arm 8 and across the standard 7. A grooved pulley 13 is fixed to the end of the shaft 12 opposite the stitching head 9 and is adapted to be driven by any suitable power.

The work presenting mechanism consists of a main presser foot 14 which is fixed to the stitching head 9, a work clamp 15 which cooperates with the work below said main presser foot, a lower feeding mechanism 16, an upper feeding mechanism 17, a lower plunger mechanism 18, an upper plunger mechanism 19, and a movable presser foot 20.

The needle mechanism 10 includes a reciprocatory needle 21 having its path of movement in or parallel with the line of feed. The needle 21 is secured to the arm 22 of a needle lever 23 which is journaled on a fixed shaft 24 secured to the stitching head 9. The needle lever 23 is mounted on the stub shaft 24, not only for oscillatory movements about said shaft, but also for lateral movements longitudinally of said shaft. The other arm 25 of the needle lever 23 is pivotally connected as at 26 with the lower end of a link 27, the upper end of said link being pivotally connected as at 28 to one arm 29 of a bell crank lever 30 which is journaled on the stitching head 9, the other arm 31 of the bell crank lever being pivotally connected as at 32 with the lower end of a link 33. The upper end of the link 33 is connected to an eccentric pin 34 formed on a jack shaft 35 which is journaled in the stitching head 9 below the main shaft 12 and extends in parallelism therewith. A "1 to 1" gear coupling 35$^a$ connects the main shaft 12 and the jack shaft 35 and consequently during each complete rotation of the main shaft 12 the needle 21 is thereby given a complete reciprocation in the line of feed.

It is desirable to impart a shogging motion to the needle 21 whereby the needle during one reciprocation will enter the base layer A and emerge therefrom and whereby during the following reciprocation the needle will enter the upturned folded portion $b'$ of the lining. To this end, I have provided the following mechanism which will impart a positive lateral shifting movement to the needle lever 23.

The needle lever 23 is formed with a hub extension 36 journaled on the stub shaft 24 and this hub extension is formed with a peripheral groove 37 which receives a slide block 38 secured to the lower end of an arm 39 of a bell crank lever 40, said lever 40 being fulcrumed as at 41 to the stitching head 9. The other arm 42 of the bell crank lever is provided at its outer end with a fork 43 for engagement with an actuating cam 44. The cam 44 (Fig. 12) is fixed to a shaft 45 which is journaled in the stitching head 9 and has its longitudinal axis disposed in parallelism with the line of feed. The cam shaft 45 is rotated once to every two revolutions of the main shaft 12. In order to thus rotate the cam shaft 45, I have journaled a substantially vertical shaft 46 on the stitching head 9 and this shaft 46 is driven from the gear coupling 35$^a$ through the medium of a gear 47 fixed to said shaft 46. Fixed to the shaft 46 is a worm 48 which drives a pinion 49 fixed to the cam shaft 45. The cam 44 is of the peripheral type and, as shown in Figure 12, includes two separated concentric portions 50 and 51 respectively. These concentric portions are oppositely disposed and are of different radii, the portion 50 having the largest radius. The concentric portion 50 extends from the point $d$ to the point $e$, and the portion 51 extends from the point $f$ to the point $g$, as shown in said figure. As a result of the positive driving connection between the cam 44, the bell crank lever 40 and the needle lever 23, the latter will be shogged along the stub shaft 24 while the needle is in its forward position. The cam shaft 45 rotates in an anti-clockwise direction as viewed from the front of the machine and consequently when the concentric portion 50 is disposed above the axis of the cam shaft, the bell crank lever 40 is in a position whereby the needle will reciprocate in its lefthand position, whereas when the portion 51 of the cam is above the axis thereof, the bell crank 40 will be positioned so that the needle will reciprocate in its right hand position.

Cooperating with the needle 21 to form a line of straight-away stitches is a rotary hook 52 and this hook is given two complete rotations to each reciprocation of the needle. The hook is fixed to a shaft 53 (see Fig. 3) and fixed to this shaft is a bevel gear 54 which is driven from a corresponding bevel gear 55 fixed on the vertical shaft 46. Inasmuch as the gear coupling 54—55 is a "1 to 1" coupling, the hook 52 will be rotated during each rotation of the vertical shaft 46.

The presser foot 14 is fixedly secured to the lower portion of the stitching head 9 and cooperating with the underface of the presser foot is the work clamp 15, the lower feed mechanism 16, and the lower plunger mechanism 18.

The lower feeding mechanism 16 includes a feed dog 56 which is of the 4-motion type and the mechanism for operating this feed dog is substantially identical with that shown in my former Patent 1,588,132, issued June 8, 1926. The backward and forward movement of the feed dog is obtained through the medium of a rock shaft 57, which I term the "feed travel" shaft, and the up and down movement of the feed dog is obtained from a rock shaft 58, which I term the "feed lift" shaft. These rock shafts 57—58 extend longitudinally within the work arm 6 and have their righthand ends journaled in a bearing lug 59 and their lefthand ends journaled in bearings formed in a block 60 which is detachably secured to the lefthand end of the work arm by screws 61. Fixed to the outer end of the "feed travel" shaft 57 is a rock arm 62 and pivotally connecting the outer ends of the rock arm and the forward extremity of the feed dog 56 is a link 63. The rock arm 62 extends in a general vertical direction and the link 63 extends in a general horizontal direction. Thus upon movement of the rock arm 62, the link 63 will impart backward and forward movements to the feed dog 56. The feed dog is pivotally connected, as at 64, to the upper end of a substantially vertically disposed link 65, the lower end of the link being vertically connected, as at 66, to the horizontal arm 57 of a bell crank lever 68, the vertical arm 69 of the bell crank lever being vertically connected as at 70 to one end of a link 71, the other end of said link 71 being pivotally connected as at 72 to the outer end of a vertically disposed rock arm 73 fixed to the "feed lift" shaft 58. In order to maintain the feed surface of the feed dog in a substantially horizontal plane during the feed movements thereof, I have provided a spring 74 which is connected by a pin 75 fixed to the link 65 and a pendent tail 76 fixed to the feed dog. It will, therefore, be observed that upon rocking movement of the "feed lift" shaft 58, the vertical link 65 will be bodily raised and lowered and consequently the feed dog will be given its up and down movements. By proper timing of the shafts 57 and 58, a 4-way feed motion will be imparted to said dog.

The bell crank lever 68 is pivotally connected, as at 77, and this pivot is fixed to a head 78 secured to the lower end of a guide post 79, said head and post forming a vertically movable carrier. The post 79 is mounted for vertical sliding movements in a bore formed in the end block 60, and this block is formed with a seat 80 for engagement by the head 78 to limit the upward movement of the carrier. The carrier is normally held in its highest position, that is, with the head 78 bearing against the seat 80, by means of a flat spring 81, the inner end of which is rigidly secured to the work arm 6 and the outer end thereof is disposed under the head 78 so as to yieldably retain the carrier in its highest position. The upper end of the post 79 projects above the block 60 and carries a pair of rearwardly projecting arms 82—82 between which is pivoted, as at 83, the work clamp 15.

From the foregoing it will be observed that when the feed dog 56 is elevated to its highest position, the fulcrum of the bell crank lever 68, is then shifted to the pivot 66 and consequently the last part of the rocking movement of the crank arm 73 will cause the bell crank lever 68 to be moved downwardly about its fulcrum 66 thus lowering the work clamp 15. The parts are so timed that the work clamp is lowered prior to the feeding movement of the feed dog. The reverse order of movement will take place at substantially the time the feed dog reaches the end of its feeding stroke, thus causing the clamp to engage the fabric and clamp the latter against the bottom of the main presser foot 14 so as to retain the fabric against movement while the needle is penetrating the material and emerging therefrom.

In order to rock the "feed travel" shaft 57 and the "feed lift" shaft 58, I provide the main shaft 12 with two eccentrics. A connection rod 84 has its upper end engageable with one of said eccentrics and has its lower end pivotally connected as at 85 to a rock arm 86 fixed to the "feed travel" shaft 57. A connection rod 87 has its upper end engageable with the other eccentric mounted on the main shaft and has its lower end pivotally connected as at 88 to a rock arm 89 fixed to the "feed lift" shaft 58. The connection rods 84 and 87 are disposed within the standard 7 of the machine frame and the eccentrics which are mounted on the main shaft for actuating these rods are timed so as to bring about a 4-motion movement to the feed dog.

As previously stated this particular machine is adapted for felling coat linings to the body fabric and this material is fed past the stitch forming mechanism whereby the needle during one reciprocation will enter the base layer and emerge therefrom and on the next reciprocation the needle will enter the under ply of the upturned folded portion and emerge therefrom. In order to position the base layer whereby the needle will penetrate and emerge therefrom, I have provided a lower plunger mechanism which includes a vertically reciprocatory plunger for projecting a node of the base layer material into needle penetrating position. For this purpose, I have provided the main or fixed presser foot 14 with a vertical opening 90 which is located directly below the stub shaft 24 which supports the needle lever 23. The plunger mechanism 18 includes a plunger 91 which is disposed directly below the opening 90 formed in the main presser foot. The plunger 91 is slidable in a vertically disposed barrel 92 which in turn is mounted to slide within a vertical bore formed in the end block 60. The plunger 91 is provided with a reduced lower extension 93 which passes downwardly through the bottom or closed end of the barrel 92 and attached to the lower end of said extension is a nut 94 which forms a stop disposed within the barrel. Between the plunger proper and the bottom of the barrel is a coiled spring 95 which yieldably retains the plunger in its uppermost position relative to the barrel but permits of said plunger moving downwardly relative to the barrel. Secured to the bottom of the barrel 92 is a bracket 96 which extends inwardly within the work arm 6 and pivoted to this bracket is one end of a link 97, the other end of said link being pivotally connected to one end of a rock arm 98 which is mounted on a rock shaft 99 for transverse adjustment by means of an adjusting screw 100. The lever 98 is secured to the shaft 99 so as to oscillate therewith and thereby raise and lower the plunger 91. The shaft 99 extends within the work arm 6 and has its inner end journaled in the lug 59 and its outer end in the end block 60.

It is desirable to variably oscillate the plunger rock shaft 99 so as to alternately reciprocate the plunger to high and low positions whereby the plunger will on its high position project a node of base material into needle penetrating position, and whereby the plunger in its low position will not project a node of said material into needle penetrating position. To this end, I have provided a driving connection between the plunger operating shaft 99 and the main rotary shaft 12 which includes a toggle for insuring the plunger partaking of its long and short strokes during alternate rotations of the main shaft. Fixed to the main shaft 12 is a gear 101 which drives a gear 102 journaled within the standard 7. The gear 102 carries an eccentric pin 103 and journaled on this pin is a guide 104. An eccentric 105 is fixed to the shaft 12 adjacent the gear 101 and a lever 106 has its upper end operatively connected with the eccentric. The lever 106 has sliding engagement in the guide 104 whereby said lever will be moved lengthwise or up and down through the medium of the eccentric 105, and thereby simultaneously operated about the eccentric 105 by means of the eccentrically supported slide 104. The lower end of the lever 106 is pivotally connected as at 107 to the upper end of a link 108. The lower end of the link 108 is pivotally connected as at 109 to a substantially horizontal link 110 which is journaled at one end to the base 5. The other end of the link 110 is pivotally connected to the upper end of a substantially vertically disposed link 111, and the lower end of this link is pivotally connected to a rock arm 112 fixed to the plunger operating shaft 99.

It is desirable to depress the lower feed dog 56 and also the work clamp 15 in order to permit the work to be inserted under the main presser foot 14, or to be withdrawn therefrom. I have, therefore, provided manually operable means for withdrawing the lower feed dog and the work clamp simultaneously from operative or working position. For this purpose, a lever 113 is journaled on the plunger operating shaft 99 through the medium of two bearing arms 114—114. The lever 113 extends longitudinally of the work arm 6 and has its outer end provided with an offset projection 115 which engages directly above the head 78 of the post 79 which supports the work clamp 15. The inner end of the lever 115 is provided with an operating extension 116 which is normally disposed in a substantially horizontal plane and is located within the base 5. A spring 117 connects one of the bearing arms 114 with the base 5, as shown in Fig. 7, for the purpose of yieldably retaining the lever 113 against undesirable vibrations. A foot treadle, knee press, or any other manual means is adapted to be connected with this operating extension 116 so as to oscillate the lever 113 and depress the post 79 against the tension of the spring 81. When the post 79 is thereby lowered, the fulcrum 77 of the bell crank lever 68 will be bodily moved downwardly therewith and as a result the link 65 together with the feed dog 66 and the clamp 15 will be lowered simultaneously thereby permitting work to be inserted under the main foot 14 or to be withdrawn from thereunder.

The main presser foot 14 includes a heel 118 and a toe 119, the opening 90 being located therebetween. The upper face of the toe 119 is provided with a pair of upstanding ribs 120—120 forming therebetween a needle guide groove 121 which extends in the line of feed and is disposed directly in front of the opening 90. The toe 119 is also provided with a longitudinally extending guideway 122 for the upturned folded portion $b'$ of the lining, as will be hereinafter fully explained. This guideway 122 extends in the line of feed and includes a vertical wall 123 which is carried by the toe 119, the wall extending in the line of feed and being disposed on the left-hand side of the needle guide 121. The guideway extends from a point in front of the needle guide 121 to a point in rear of the opening 90 so as to guide the upturned folded portion $b'$ of the fabric in a vertical plane past the point of needle penetration. Located on the lefthand side of the guideway 122 is an offset presser foot portion 124 which supports the horizontally movable presser foot 20 and a horizontally reciprocable upper plunger 126, both the presser foot 20 and the plunger 126 being disposed in a vertical plane containing the point of needle penetration and disposed at right angles to the line of feed. In other words, the lower plunger 91, the opening 90, the horizontal presser foot 20, and the upper plunger 126 are all located in the same vertical plane containing the point of needle penetration.

The offset portion 124 of the main presser foot 14 is formed in its upper face with a recess or seat 127 which extends across said portion from one side to the other. The movable presser foot 20 includes a foot 128 which is disposed within the guideway 122 for cooperation with the vertical wall 123, and a shank 129 which is mounted within the seat or recess 127 for relative sliding movement. The foot 128 extends across an opening 130 formed in the lower portion of the vertical guiding wall 123 at a point in alinement with the opening 90. The upper horizontal plunger 126 is slidably mounted in a guiding groove 131 formed in the lower face of the shank 129 of said presser foot 20, the guiding groove extending longitudinally of the shank and also extending through the foot 128 so as to position said plunger 126 in alinement with the point of needle penetration. The plunger 126 includes at its inner end a downwardly extending stop 132 which cooperates with a vertical wall 133 formed on the offset portion 124 of the main presser foot to limit the outward movement of said upper plunger. The outer end of the upper plunger 126 is provided with an upwardly extending arm 134 forming a resultant stop shoulder 135 at its inner vertical edge. The arm 134 is bent rearwardly to form a bearing arm 136. The arm 134 is adapted to slide within a correspondingly shaped recess 137 formed in the outer end of the shank 129 of the presser foot 20. Formed in the shank 129 and opening into the recess 137 is a seat 138 for receiving one end of a coiled spring 139, the upper end of said spring extending outwardly within the recess 137 and engaging the shoulder 135 formed on the upper plunger 126. As a result, the spring 139 tends to push the upper plunger 126 outwardly to its limit of movement which is fixed by the stop arm 132 engaging the shoulder 135. Simultaneously the spring 139 exerts an inward pressure against the movable presser foot 20 so as to yieldably hold said presser foot against the vertical guide wall 123. Thus the movable presser foot 20 is yieldably held against the guiding wall 123 and simultaneously the upper plunger 126 is yieldably held in its inoperative position at one side of the guideway 122. A cover plate 140 is secured to the presser foot 14 by screws 141—141 and extending upwardly through an opening 142 formed in said cover plate is an arm 143 which is fixed to the movable presser foot 20 and is adapted to be engaged by a lever 144 for moving said presser foot 20 outwardly against the tension of the spring 139.

The upper feeding mechanism 17 cooperates with the lower feeding mechanism 16 to feed both the upper and lower layers of material in unison. This upper feeding mechanism includes a feed dog 145 which is fixed to a feed bar 146. The feed dog 145 is provided with a series of fabric engaging teeth 147, and this dog is mounted for feeding movements in a horizontal plane, that is, the feeding movements of the upper feed dog are in a plane at right angles to the feeding movements of the lower feed dog. The upper feed dog 145 is located in rear of the offset portion 124 of the main presser foot 14 and the teeth 147 cooperate with that portion of the guiding wall 123 which extends in rear of the movable presser foot 20. Four motions are imparted to the feed dog 145, that is, back and forth and in and out, the back and forth movements being in the line of feed, whereas the in and out movements are in a plane transverse to the line of feed. The feeding movements of the feed dog 145 are in unison with the feeding movements of the lower feed dog 56. In order to reciprocate the upper feed dog 145 forwardly and backwardly, I have provided a vertically extending lever 148 which is fulcrumed on a horizontal axis 149 on the rear face of the stitching head 9 and the lower end of the lever 148 being pivotally connected to the feed bar 146 by right angle connections 150—150$^a$, the former being a horizontal pivot and the latter a vertical pivot. The upper end of the lever 148 is provided with a segmental slot 151 having a pin connection 152 with a pitman 153, the other end of the pitman being connected to an eccentric pin 154 fixed to the shaft 35. By means of said connection the feed stroke may be readily adjusted. Inasmuch as the shaft 35 is driven by a "1 to 1" gear coupling 35$^a$, it will be apparent that the upper feed dog will be given a complete backward and forward movement during each complete rotation of the main shaft 12, or during one complete oscillation of the needle 21. In order to impart in and out movements to the upper feed dog 145, I have provided the feed bar 146 with an upwardly extending slide plate 155. This plate is preferably formed integral with the feed bar 146 and extends longitudinally of said bar. An operating lever 156 has its lower end slotted, as at 157, to form a fork for engaging the slide plate 155. The lever 156 is fulcrumed intermediate its ends on a crank pin 158 fixed to a crank arm 159 mounted on a crank shaft 160 which is journaled in the stitching head 9 with its axis parallel to the line of feed. The upper end of the operating lever 156 is provided with a cam roller 161 which has direct contact with a peripheral cam 162 fixed to the shaft 45. A spring 163 has one end connected to the upper end of the operating lever 156 and the other end connected to the stitching head 9 for yieldably retaining the cam roller 161 in engagement with the cam 162. The cam 162 (Fig. 13) is formed with opposed high points $h$ and $i$ of equal radius, and inasmuch as the shaft 45 makes one complete rotation to every two complete rotations of the main shaft 12, it will be apparent that the operating lever 156 will be given a complete oscillation during each complete rotation of the main shaft 12.

The lever 144 which cooperates with the upwardly extending arm 143 of the movable presser foot 20 has its upper end fixed to the crank pin 158.

From the above it will be observed that when the crank shaft 160 is oscillated the crank pin 158, which constitutes a movable fulcrum for the operating lever 156, will be shifted, thereby changing the fulcrum of the lever 156 to the cam roller 161. The oscillation of the cam shaft 160 will be made against the tension of the spring 163 and by shifting the fulcrum or crank pin 158 to the left, as viewed in Fig. 1, will result in the feed bar 146 being moved outwardly so as to withdraw the feed dog 145 from its engagement with either the fabric b' or the vertical guide wall 123. During this outward movement of the feed bar 146, the latter will of course swing about its vertical pivotal connection 150$^a$.

Inasmuch as the lever 144 is fixed to the crank pin 158, the presser foot 20 will be moved outwardly against the tension of the spring 139 simultaneously with the feed dog 145 being moved outwardly as the result of oscillating the crank shaft 160.

In order to support the upper feed dog 145 during its movements, I have provided the main presser foot 14 with a guide 164 which consists of upper and lower plates 165 and 166 united by a connecting portion 167. The plates 165—166 are spaced apart a distance sufficient to receive the feed dog 145. The guide 164 is supported from the lefthand side of the presser foot by means of a flange 168 and attaching screws 169, the flange being connected to the upper plate 165. The forward end of the lower plate 166 extends under the offset portion 124 of the presser foot 14, as shown at 170, and is secured to the offset portion by a screw 171. The guide 164 is spaced from the guiding wall 123 so as to form therebetween the guideway 122. The lower plate 166 of the guide is disposed slightly above the bottom of the main presser foot 14 for cooperation with the lefthand feed section of the lower feed dog 56.

In order to reciprocate the upper plunger 126 in timed relation to the needle penetrations, I have provided an operating lever 172 which is fulcrumed intermediate its ends on a crank pin 173 fixed to a crank arm 174 carried by a crank shaft 175 which is mounted for oscillations in the stitching head 9, the axis of the shaft being parallel to the crank shaft 160. Fixed to the rear end of the crank shaft 175 is a stop arm 176 which is adapted to slide in a groove 177 formed in said stitching head. This groove 177 extends vertically and the side walls thereof limit the amount of oscillation not only of the stop arm 176 but also of the crank shaft 175. A spring 178 has one end connected to the stop arm 176 and the other end connected to the stitching head 9. This spring 178 serves to hold the arm 176 against one wall of the groove 177 and thereby yieldably retain the crank shaft 175 against oscillation. The upper end of the lever 172 carries a cam roller 179 which is yieldably held by the spring 139 of the movable presser foot 20 in direct contact with a peripheral cam 180 fixed to the shaft 45. The lower end of the operating lever 172 carries an adjusting screw 181 for direct contact with the bearing arm 136 of the upper plunger 126. The screw 181 is provided with a knurled head 182 and a spring retainer finger 183 is fixed to the lower end of the lever 172 for cooperation with said knurled head to hold the screw in any position of adjustment. By means of the screw 181 the inward movement of the upper plunger 126 may be adjusted to vary the working or operative position of said upper plunger. The cam 180 has a single high point and the cam is timed on the shaft 45 so as to actuate the lever 172 and thereby project the upper plunger to working position in advance of the penetrating movement of the needle when the latter is on its lefthand shogging stroke only. In other words, the upper plunger is not actuated by the lever 172 while the needle is partaking of its righthand shogging movement.

As the result of mounting the lever 172 on the crank shaft 175 and providing the spring 178, the lever is permitted to shift its fulcrum from the crank pin 173 to the cam roller 179 whenever a seam becomes positioned in front of the upper plunger, thereby eliminating any possibility of said seam choking the machine or otherwise retarding the proper feeding of the fabric through the machine.

In order to withdraw the top feed dog 145 and the movable presser foot 20 from cooperating engagement either with the fabric b' or the guiding wall 123 so as to easily insert fabric in the guideway 122 or withdraw fabric therefrom, I have provided the crank shaft 160 with a rock arm 184. A spring 185 has one end connected to the rock arm 184 and the other end to the stitching head 9, and this spring serves to yieldably retain the cam shaft 160 against oscillation. Pivotally connected to the arm 184 is one end of a vertically disposed push rod 186, said rod being mounted in bearings formed in the stitching head 9. Mounted upon the stitching head 9 is a horizontally disposed operating lever 187 which is fulcrumed as at 188. One end of the lever 187 is normally disposed above and in contact with the upper end of the push rod 186, and pivotally connected to the other end of said lever 187 is a push rod 189 which is guided intermediate its ends in a bearing 190 formed in the standard 7 of the machine frame. The lower end of the push rod 189 rests upon the operating arm 116 of the lever 113 which is fulcrumed on the plunger operating shaft 99. As a result when the arm 116 is elevated through the medium of a knee press, treadle, or the like, the lever 113 will be oscillated and the lower feed dog 56 together with the work clamp 15 will be depressed from cooperative relation with the main presser foot 14 and against the action of the flat spring 81. Simultaneously therewith, the push rod 189 will be moved upwardly by the arm 116, the lever 187 will be oscillated, the push rod 186 will be moved downwardly and the crank shaft 160 will be oscillated against the tension of the spring 185. Upon oscillation of the crank shaft 160, the upper feed dog 145 and the horizontally movable presser foot 20 will be moved outwardly from cooperation with the fabric $b'$ located with the guideway 122. Thus the material may be either readily removed from the machine or material may be readily inserted in the machine. After the removal or insertion of the material, the manually controlled means is released and the spring 81 will return the lower feed dog 56 and the clamp 15 to their normal working positions and simultaneously the spring 185 will return the upper feed dog 145 and the horizontally movable presser foot 20 to their normal working positions.

It is desirable to vary the depth of the needle penetration in the body fabric A relative to the upper face thereof in order to meet the various practical requirements of garment manufacture. It is desirable to provide a readily accessible means for accomplishing this purpose, and to this end, I have provided a vertically adjustable stop which is disposed directly above the lower plunger 91 and bears against the upper face of the base layer A so as to variably limit the upward movement of the plunger. This adjustable stop is carried by a fixed part of the stitching head 9, and in this particular instance, I have positioned the stop on the main presser foot 14. The stop includes a horizontal arm 191 which is disposed within a recess 192 formed in the bottom of the presser foot and extending transversely thereof in a plane containing the plunger 91. The inner end of the arm 191 projects for a short distance into the opening 90 of the presser foot and the upper surface of this projecting end is dished as at 193 directly above said plunger. The arm 191 extends outwardly to the side of the presser foot and is integrally connected to a supporting arm 194 which extends parallel with the side of the presser foot. The arm 194 extends rearwardly and is fixed to the presser foot by means of a set screw 195 which passes through an opening formed in the rear end of the arm 194. Thus the stop is adapted to be swung about the pivot 195 and thereby move the dished stop portion 193 towards and from the plunger 91. In the normal setting of the stop, the same is adjusted to its highest position and clamped by the screw 195. In order to move the stop portion 193 downwardly towards the plunger 91 and thereby limit the upper movement of the latter and consequently control the depth of needle penetration in the base layer, I have provided the presser foot 14 with an adjusting screw 196 having direct contact with the arm 191. The screw is provided with a knurled head 197 and a spring finger 198 is fixed to the foot for engagement with said knurled head so as to retain the adjusting screw in any position of adjustment. When it is desired to raise the stop, the set screw 196 is turned backwardly and the stop is swung upwardly about its pivot 195 after which the adjusting screw 196 may be reoperated to reset the stop to its desired position of adjustment.

In the operation of my invention for felling coat linings, the base layer or body fabric A and the superposed layer or lining B are first united by the line of basting stitches S, the basting stitches also serving to anchor the infolded edge portion $b$ of the folded marginal portion $b'$ of the lining.

The main shaft 12 is turned until the lower plunger 91 is positioned at the upper end of its short stroke and the needle 21 is at the beginning of a reciprocation.

The work is then fed into the machine, the base layer A being positioned between the main presser foot 20 and the lower feed 56 and work clamp 15, the main portion of the lining B being disposed under the left side of the main presser foot 14, and the upturned marginal edge portion $b'$ of the lining being directed into the vertical guideway 123. Thus the base layer A is directly engaged by the lower feed dog 56 and the upturned marginal edge portion $b'$ of the lining is directly engaged by the upper feed dog 145. The two feed dogs operate in planes at right angles to each other, and are intermittently actuated in union to feed both layers of fabric past the stitch forming mechanism, thus avoiding all drag to the superposed layer or lining B. The lower plunger 91 is moved upwardly on its long stroke to project a node $x$ of base layer material into the path of needle reciprocation. While the plunger retains the node in this position the needle 21 is moved forwardly in its righthand penetrating stroke and enters and emerges from the node $x$ of the base layer, the threaded needle loop cooperating with the rotary hook to form an anchored needle thread loop in said node. The needle is then returned to its initial position, and while the needle is being shogged to the left, the upper and lower feed dogs cooperate with the vertical guide wall 123 and the main presser foot 14 to feed the material a stitch length. The upper plunger 126 is then moved to the right projecting a node $y$ of the superposed layer through the opening 130 of the guide wall 123 to position for penetration by the needle 21 on its next forward movement which occurs in its lefthand shogging position. In the meantime, the lower plunger 91 is given its short stroke which is an idle one because it does not project a node of base layer. The needle cooperates with the rotary hook 52 to form an anchored needle thread loop in the node *y* of the lining. It will be observed that the guiding wall 123 and the movable presser foot cooperate to clamp the upturned portion *b'* of the lining B therebetween, thereby holding the fabric for the thrust of the upper plunger as well as holding the fabric against the thrust of the needle. This is a very important feature of my invention because the lining B being of very thin fabric it is necessary in order to insure the needle entering and emerging from the face of the fabric not only at uniform depths but also at uniform intervals. The needle is then returned to its initial position and the upper plunger is likewise returned to its initial position. The feed dogs then function to feed the material a stitch length, and the needle is shogged to the right. Thus one complete cycle of operation has been completed.

Should the upturned marginal edge portion *b'* be formed with a lap, or seam, or other increased thickness, the fulcrum 173 of the upper plunger operating lever 172 will be automatically shifted to the left against the tension of the spring 178, thereby insuring the proper feeding of the portion *b'* without the danger of otherwise choking the machine or creating a drag to said portion.

It will be noted that the upper plunger lever 172 is actuated by the cam 180, and consequently the lever movement is constant and uniform. By providing the adjusting screw 181 at the lower end of the lever for cooperation with the plunger, the working position of the plunger may be readily adjusted to suit fabrics of different thicknesses.

When it is desired to insert the work in the machine or withdraw the work therefrom, the knee press or treadle is actuated to rock the lever 113, and as a result the lower feed dog 56 and work clamp 15 will be depressed or lowered from cooperative engagement with the main presser foot 14, and simultaneously the upper feed dog 145 and the movable presser foot 20 will be moved to the left to thereby leave the guideway 122 free from any obstructions. Upon release of the lever 113, the parts will automatically return to their initial positions.

It is of course to be understood that the details of structure and arrangements of parts may be variously changed and modified without departing from the spirit and scope of my invention.

I claim:

1. In a blind stitch sewing machine for felling a superposed layer to a base layer, the combination of a reciprocatory needle and a cooperating stitch forming mechanism, and a work presenting mechanism for directing the turned-up edge portion of the superposed layer past said stitch forming mechanism including a vertically disposed guide extending from in front of the point of needle penetration to the rear thereof, means disposed below the base layer for projecting a node of base layer material into needle penetrating position, a horizontally reciprocatory plunger operating above the base layer and cooperating with said guide to project a node of up-turned edge portion material into needle penetrating position, means for clamping the upturned edge portion against the guide during the projecting stroke of the horizontally reciprocatory plunger, and means for reciprocating said plunger.

2. In a blind stitch sewing machine for felling a superposed layer to a base layer, the combination of a reciprocatory needle and a cooperating stitch forming mechanism, and a work presenting mechanism for directing the turned-up edge portion of the superposed layer past said stitch forming mechanism including a vertically disposed guide extending from in front of the point of needle penetration to the rear thereof, a vertically reciprocatory plunger operating below the base layer for projecting a node of base layer material into needle penetrating position, means for clamping the upturned edge portion against the guide, a horizontally reciprocatory plunger operating above the base layer and cooperating with said guide and said clamping means to project a node of upturned edge portion material into needle penetrating position while said upturned portion is clamped against the guide, and means for alternately reciprocating said plungers in timed relation with the needle reciprocations.

3. In a blind stitch sewing machine for felling a superposed layer to a base layer, the combination of a reciprocatory needle and a cooperating stitch forming mechanism, and a work presenting mechanism for directing the turned-up edge portion of the superposed layer past said stitch forming mechanism including a vertically disposed guide extending from in front of the point of needle penetration to the rear thereof, means disposed below the base layer for projecting a node of base layer material into needle penetrating position, a horizontally reciprocatory plunger operating above the base layer and cooperating with said guide to project a node of upturned edge portion material into needle penetrating position, a horizontally movable presser foot for clamping the upturned edge portion against the guide during the projecting stroke of the horizontally reciprocatory plunger, and means for reciprocating said plunger.

4. In a blind stitch sewing machine for felling a superposed layer to a base layer, the combination of a reciprocatory needle and a cooperating stitch forming mechanism, and a work presenting mechanism for directing the turned-up edge portion of the superposed layer past said stitch forming mechanism including a vertically disposed guide extending from in front of the point of needle penetration to the rear thereof, means disposed below the base layer for projecting a node of base layer material into needle penetrating position, a horizontally reciprocatory plunger operating above the base layer and cooperating with said guide to project a node of upturned edge portion material into needle penetrating position, means for clamping the upturned edge portion against the guide during the projecting stroke of the horizontally reciprocatory plunger, said horizontally reciprocatory plunger and said clamping means being disposed in a plane containing the point of needle penetration and disposed in a plane at right angles to said guide, and means for reciprocating said plunger.

5. In a blind stitch sewing machine for felling a superposed layer to a base layer, the combination of a reciprocatory needle and a cooperating stitch forming mechanism, and a work presenting mechanism for directing the turned-up edge portion of the superposed layer past said stitch forming mechanism including a vertically disposed guide extending from in front of the point of needle penetration to the rear thereof, means disposed below the base layer for projecting a node of base layer material into needle penetrating position, a horizontally reciprocatory plunger operating above the base layer and cooperating with said guide to project a node of upturned edge portion material into needle penetrating position, a horizontally movable presser foot for clamping the upturned edge portion against the guide during the projecting stroke of the horizontally reciprocatory plunger, a single spring for normally holding said horizontal plunger to ineffective position and for yieldingly holding said foot against said upturned edge portion, means for moving said horizontal plunger to effective working position against the tension of said spring, and means for actuating said plunger.

6. In a blind stitch sewing machine for felling a superposed layer to a base layer, the combination with a reciprocatory needle and a complemental stitch forming mechanism, and a work presenting mechanism including a vertically disposed guiding wall extending from in front of the point of needle penetration to a point in rear thereof for guiding an upturned marginal portion of the superposed layer past the stitch forming mechanism, means for clamping an upturned marginal portion of the superposed layer, and a horizontally reciprocatory plunger for projecting a node of said upturned marginal portion into needle penetrating position while said portion is engaged by said clamping means.

7. In a blind stitch sewing machine for felling a superposed layer to a base layer, the combination with a reciprocatory needle and a complemental stitch forming mechanism, and a work presenting mechanism including a vertically disposed guiding wall extending from in front of the point of needle penetration to a point in rear thereof for guiding an upturned marginal portion of the superposed layer past the stitch forming mechanism, a horizontally movable presser foot cooperating with the guiding wall to clamp the upturned marginal portion of the superposed layer therebetween, and a horizontally reciprocatory plunger for projecting a node of said upturned marginal portion into needle penetrating position while said portion is being clamped between the foot and the guiding wall.

8. In a blind stitch sewing machine for felling a superposed layer to a base layer, the combination with a reciprocatory needle and a complemental stitch forming mechanism, and a work presenting mechanism including a vertically disposed guiding wall extending from in front of the point of needle penetration to a point in rear thereof for guiding an upturned marginal portion of the superposed layer past the stitch forming mechanism, a horizontally movable presser foot cooperating with the guiding wall to clamp the upturned marginal portion of the superposed layer therebetween, and a horizontally reciprocatory plunger for projecting a node of said upturned marginal portion into needle penetrating position while said portion is being clamped between the foot and the guiding wall, said presser foot and plunger being movable in a plane containing the point of needle penetration.

9. In a blind stitch sewing machine for felling a superposed layer to a base layer, the combination with a reciprocatory needle and a complemental stitch forming mechanism, and a work presenting mechanism including a main presser foot having a vertically disposed guideway including a vertical wall extending rearwardly from the front edge of the foot to a point in rear of the point of needle penetration for guiding an upturned marginal portion of the superposed layer past the stitch forming mechanism, a horizontally movable presser foot supported on the main foot for cooperation with said wall to clamp the upturned marginal portion therebetween, and a horizontally reciprocatory plunger for projecting a node of said upturned marginal portion into needle penetrating position while said portion is being clamped between the foot and the guiding wall.

10. In a blind stitch sewing machine for felling a superposed layer to a base layer, the combination with a reciprocatory needle and a complemental stitch forming mechanism, and a work presenting mechanism including a vertically disposed guiding wall extending from in front of the point of needle penetration to a point in rear thereof for guiding an upturned marginal portion of the superposed layer past the stitch forming mechanism, a horizontally movable presser foot cooperating with the guiding wall to clamp the upturned marginal portion of the superposed layer therebetween, a horizontally reciprocatory plunger for projecting a node of said upturned marginal portion into needle penetrating position while said portion is being clamped between the foot and the guiding wall, means for yieldably retaining the movable foot against the upturned marginal portion, and manually controlled means for withdrawing said foot from engagement with said upturned marginal portion.

11. In a blind stitch sewing machine for felling a superposed layer to a base layer, the combination with a reciprocatory needle and a complemental stitch forming mechanism, and a work presenting mechanism including a vertically disposed guiding wall extending from in front of the point of needle penetration to a point in rear thereof for guiding an upturned marginal portion of the superposed layer past the stitch forming mechanism, a horizontally movable presser foot cooperating with the guiding wall to clamp the upturned marginal portion of the superposed layer therebetween, a horizontally reciprocatory plunger for projecting a node of said upturned marginal portion into needle penetrating position while said portion is being clamped between the foot and the guiding wall, means for yieldably retaining the plunger out of engagement with the upturned marginal portion, and means including a cam and a lever for moving said plunger to working position.

12. In a blind stitch sewing machine for felling a superposed layer to a base layer, the combination with a reciprocatory needle and a complemental stitch forming mechanism, and a work presenting mechanism including a vertically disposed guiding wall extending from in front of the point of needle penetration to a point in rear thereof for guiding an upturned marginal portion of the superposed layer past the stitch forming mechanism, means for clamping an upturned marginal portion of the superposed layer, a horizontally reciprocatory plunger for projecting a node of said upturned marginal portion in to needle penetrating position while said portion is engaged by said clamping means, operating means for projecting said plunger to working position, and means for varying the working position of said plunger.

13. In a blind stitch sewing machine for felling a superposed layer to a base layer, the combination with a reciprocatory needle and a complemental stitch forming mechanism, and a work presenting mechanism including a vertically disposed guiding wall extending from in front of the point of needle penetration to a point in rear thereof for guiding an upturned marginal portion of the superposed layer past the stitch forming mechanism, means for clamping an upturned marginal portion of the superposed layer, a horizontally reciprocatory plunger for projecting a node of said upturned marginal portion into needle penetrating position while said portion is engaged by said clamping means, operating means for projecting said plunger to working position including a lever, and an adjusting screw carried by the lever for direct engagement with the plunger for varying the working position thereof.

14. In a blind stitch sewing machine for felling a superposed layer to a base layer, the combination with a reciprocating needle and a complemental stitch forming mechanism, and a work presenting mechanism including a vertically disposed guiding wall extending from in front of the point of needle penetration to a point in rear thereof for guiding an upturned marginal portion of the superposed layer past the stitch forming mechanism, a horizontally movable presser foot cooperating with the guiding wall to clamp the upturned marginal portion of the superposed layer therebetween, a horizontally reciprocatory plunger for projecting a node of said upturned marginal portion into needle penetrating position while said portion is being clamped between the foot and the guiding wall, means for yieldably retaining the plunger out of engagement with the upturned marginal portion, and means for moving said plunger to working position including a cam, a lever operated thereby, and an adjustable screw carried by the lever for engagement with the plunger to vary the working position of said plunger.

15. In a blind stitch sewing machine for felling a superposed layer to a base layer, the combination with a reciprocatory needle and a complemental stitch forming mechanism, and a work presenting mechanism including a vertically disposed guiding wall extending from in front of the point of needle penetration to a point in rear thereof for guiding an upturned marginal portion of the superposed layer past the stitch forming mechanism, a horizontally movable presser foot cooperating with the guiding wall to clamp the upturned marginal portion of the superposed layer therebetween, a horizontally reciprocatory plunger for projecting a node of said upturned marginal portion into needle penetrating position while said portion is being clamped between the foot and the guiding wall, means for yieldably retaining the plunger out of engagement with the upturned marginal portion, means for moving said plunger to working position including a cam, and a lever operated thereby and having a yieldable fulcrum.

16. In a blind stitch sewing machine for felling a superposed layer to a base layer, the combination with a reciprocatory needle and a complemental stitch forming mechanism, and a work presenting mechanism including a vertically disposed guiding wall extending from in front of the point of needle penetration to a point in rear thereof for guiding an upturned marginal portion of the superposed layer past the stitch forming mechanism, a horizontally movable presser foot cooperating with the guiding wall to clamp the upturned marginal portion of the superposed layer therebetween, a horizontally reciprocatory plunger for projecting a node of said upturned marginal portion into needle penetrating position while said portion is being clamped between the foot and the guiding wall, means for yieldably retaining the plunger out of engagement with the upturned marginal portion, means for moving said plunger to working position including a cam, a crank shaft having a crank pin, yieldable means for holding said crank shaft against rotation, and an operating lever fulcrumed on said crank pin and having one end engaged by said cam and having the other end engageable with said plunger.

17. In a blind stitch sewing machine for felling a superposed layer to a base layer, the combination with a reciprocatory needle and a complemental stitch forming mechanism, and a work presenting mechanism including a vertically disposed guiding wall extending from in front of the point of needle penetration to a point in rear thereof for guiding an upturned marginal portion of the superposed layer past the stitch forming mechanism, a horizontally movable presser foot cooperating with the guiding wall to clamp the upturned marginal portion of the superposed layer therebetween, a horizontally reciprocatory plunger for projecting a node of said upturned marginal portion into needle penetrating position while said portion is being clamped between the foot and the guiding wall, a spring interposed between the movable foot and the plunger for yieldably retaining the former in operative position and the latter in inoperative position, and means for projecting the plunger to working position against the action of said yieldable means.

18. In a blind stitch sewing machine for felling a superposed layer to a base layer, the combination of a stitch forming mechanism including a reciprocatory needle, and a work presenting mechanism including a main presser foot, a vertically disposed guide extending from in front of the point of needle penetration to the rear thereof for directing the upturned marginal portion of the superposed layer past the stitch forming mechanism, a horizontally movable presser foot cooperating with said guide to clamp the upturned marginal portion therebetween, means for projecting a node of said upturned marginal portion into needle penetrating position while said portion is being clamped between the foot and the guide, means disposed below the base layer for projecting a node of base layer into needle penetrating position, a lower feed cooperating with the main presser foot to feed the base layer past the stitch forming mechanism, and an upper feed cooperating with said guide to feed the upturned edge portion of the superposed layer past the stitch forming mechanism.

19. In a blind stitch sewing machine for felling a superposed layer to a base layer, the combination of a stitch forming mechanism including a reciprocatory needle, and a work presenting mechanism including a main presser foot, a vertically disposed guide extending from in front of the point of needle penetration to the rear thereof for directing the upturned marginal portion of the superposed layer past the stitch forming mechanism, a horizontally movable presser foot cooperating with said guide to clamp the upturned marginal portion therebetween, a horizontally reciprocatory plunger for projecting a node of said upturned marginal portion into needle penetrating position while said portion is being clamped between the foot and the guide, a vertically reciprocatory plunger operating below the base layer for projecting a node of base layer into needle penetrating position, an intermittent lower feed cooperating with the main presser foot to feed the base layer past the stitch forming mechanism, an intermittent upper feed cooperating with said guide to feed the upturned edge portion of the superposed layer past the stitch forming mechanism, said upper and lower feeds being movable in unison, and means for projecting the upper and lower plungers into working positions intermediate the feeding movements of the upper and lower feeds.

20. In a blind stitch sewing machine for felling a superposed layer to a base layer, the combination with a stitch forming mechanism including a needle reciprocatory in the line of feed, and a work presenting mechanism including a presser foot and a co-operating feeding mechanism, a vertically disposed guide extending from in front of the point of needle penetration to the rear thereof for directing the upturned edge portion of the superposed layer past the stitch forming mechanism, means for projecting nodes of the base layer and the upturned portion of the superposed layer respectively into needle penetrating positions, means for clamping the base layer against the presser foot, and means for clamping the upturned portion of the superposed layer against the guide during the formation of said nodes in said layers by said node projecting means.

21. In a blind stitch sewing machine for felling a superposed layer to a base layer, the combination with a stitch forming mechanism including a needle reciprocatory in the line of feed, and a work presenting mechanism including a presser foot and a co-operating feeding mechanism, a vertically disposed guide extending from in front of the point of needle penetration to the rear thereof for directing the upturned edge portion of the superposed layer past the stitch forming mechanism, upper and lower plungers for alternately projecting nodes of the superposed layer and the base layer into needle penetrating positions, whereby the needle on one stroke will enter and emerge from the upturned edge portion only and on the next stroke will enter and emerge from the base layer only, means for actuating said plungers, means for clamping the base layer against the presser foot, and means for clamping the upturned portion of the superposed layer against the guide during the formation of said nodes in said layers by said plungers.

22. In a blind stitch sewing machine for felling a superposed layer to a base layer, the combination with a stitch forming mechanism including a needle reciprocatory in the line of feed, and a work presenting mechanism including a presser foot and a co-operating feeding mechanism, a vertically disposed guide extending from in front of the point of needle penetration to the rear thereof for directing the upturned edge portion of the superposed layer past the stitch forming mechanism, said foot and guide being respectively formed with openings, means for projecting nodes of the base layer and the upturned portion of the superposed layer respectively through said openings into needle penetrating positions, means for respectively clamping the base layer against the presser foot, and means for clamping the upturned portion of the superposed layer against the guide during the formation of said nodes in said layers In testimony whereof I hereunto affix my signature.

CHARLES W. MUELLER.